No. 629,943. Patented Aug. 1, 1899.
G. WESTINGHOUSE.
DRAW GEAR AND BUFFING APPARATUS.
(Application filed Feb. 26, 1898.)

(No Model.) 7 Sheets—Sheet 1.

WITNESSES:
James C. Herron.
S. R. Bell.

INVENTOR,
Geo. Westinghouse,
by J. Snowden Bell,
Att'y.

THE NORRIS PETERS CO., PHOTO-LITHO., WASHINGTON, D. C.

No. 629,943. Patented Aug. 1, 1899.
G. WESTINGHOUSE.
DRAW GEAR AND BUFFING APPARATUS.
(Application filed Feb. 26, 1898.)
(No Model.) 7 Sheets—Sheet 2.

WITNESSES:
James C. Herron
S. R. Bell.

INVENTOR,
Geo. Westinghouse,
by Howden Bell,
Att'y.

THE NORRIS PETERS CO., PHOTO-LITHO., WASHINGTON, D. C.

No. 629,943. Patented Aug. 1, 1899.
G. WESTINGHOUSE.
DRAW GEAR AND BUFFING APPARATUS.
(Application filed Feb. 26, 1898.)
(No Model.) 7 Sheets—Sheet 3.

FIG. 6.

No. 629,943. Patented Aug. 1, 1899.
G. WESTINGHOUSE.
DRAW GEAR AND BUFFING APPARATUS.
(Application filed Feb. 26, 1898.)
(No Model.) 7 Sheets—Sheet 4.

WITNESSES:
James C. Herron.
S. R. Bell.

INVENTOR,
Geo. Westinghouse
by J. Snowden Bell, Att'y.

THE NORRIS PETERS CO., PHOTO-LITHO., WASHINGTON, D. C.

No. 629,943. Patented Aug. 1, 1899.
G. WESTINGHOUSE.
DRAW GEAR AND BUFFING APPARATUS.
(Application filed Feb. 26, 1898.)

(No Model.) 7 Sheets—Sheet 5.

WITNESSES:
James E. Herron.
S. R. Bell.

INVENTOR,
Geo. Westinghouse,
by Snowden Bell,
Att'y.

No. 629,943. Patented Aug. 1, 1899.
G. WESTINGHOUSE.
DRAW GEAR AND BUFFING APPARATUS.
(Application filed Feb. 26, 1898.)
(No Model.) 7 Sheets—Sheet 6.

UNITED STATES PATENT OFFICE.

GEORGE WESTINGHOUSE, OF PITTSBURG, PENNSYLVANIA.

DRAW-GEAR AND BUFFING APPARATUS.

SPECIFICATION forming part of Letters Patent No. 629,943, dated August 1, 1899.

Application filed February 26, 1898. Serial No. 671,783. (No model.)

*To all whom it may concern:*

Be it known that I, GEORGE WESTINGHOUSE, of Pittsburg, in the county of Allegheny and State of Pennsylvania, have invented a certain new and useful Improvement in Draw-Gear and Buffing Apparatus, of which improvement the following is a specification.

My present invention relates to draw-gear and buffing apparatus of the general class or type in which a frictional resistance is caused to be exerted by the impact of one railroad-car contacting with another or by draft or pulling action in order to reduce and modify resultant shocks and absorb momentum, and thereby to prevent the injurious strains to which the draft and buffing mechanism and the frames of the cars would otherwise be subjected. Instances of the class of apparatus referred to are exemplified in Letters Patent of the United States Nos. 391,997, 499,335, 499,336, 543,915, and 545,994, granted and issued to me under dates of October 30, 1888, June 13, 1893, August 6, 1895, and September 10, 1895, respectively, and in Letters Patent of the United States No. 556,197, granted and issued to me as assignee of Frank Moore under date of March 10, 1896. My invention is not, however, limited in application to any or either of the specific constructions set forth in the Letters Patent aforesaid.

The object of my invention is to provide a draft and buffing apparatus of the class above referred to the efficiency of which shall be increased by the capacity of prompt and certain release of the members of the frictional mechanism and the return thereof to normal position in readiness for further operation immediately upon the cessation of the pulling or buffing force by which the draw-bar or buffer and the frictional members have been moved from their normal positions, as well as to afford improved facilities for the support and insertion and removal of the housing and the members therein.

To this end my invention, generally stated, consists in the combination of intercalated frictional members, a wedging device for imposing frictional resistance thereon, and means for releasing the wedging device, which shall be inert during the exertion of maximum compressive strain and operative as to releasing action when and only when said maximum strain has been reduced and the application of force has been reversed; also, in the combination of a series of intercalated frictional members, a wedging device for imposing frictional resistance thereon, and means whereby releasing action is independently and successively exerted upon different units or groups of the series of frictional members.

The improvement claimed is hereinafter fully set forth.

In prior constructions, as set forth in Patents Nos. 555,994 and 556,197, aforesaid, the return of the frictional members to their normal positions depended upon the wedging device or wedge-block being forced from its position either by the frictional effort of the segmental carriers, which were in turn acted upon by a main draft and buffing spring, or by an independent releasing-spring acting directly on the wedge-block. It has been found in practice that the force which was thus exerted for returning the parts to their normal position was less than was desirable and the release and return of the parts not sufficiently prompt and certain, and in the case of the independent releasing-spring its action was exerted in opposition to that of one of the main springs and before the draft or impact strain upon the frictional members had been fully relieved, the efficiency of the apparatus being to this extent impaired. Again, in prior instances, the releasing force was exerted simultaneously upon the entire series of frictional members and was consequently opposed by their aggregate resistance, thus involving slowness and in some cases difficulty in release.

The objections above stated are overcome and a more simple and inexpensive apparatus provided under my present invention, in the form of which herein illustrated the tail-bolt which formerly passed through the central portion of the apparatus for draft purposes is dispensed with and its function is performed by a strap secured to the draw-bar and extending on the exterior of the housing or casing of the frictional members to the rear end thereof. The space which was occupied by the tail-bolt is left free for the introduction of a suitably-proportioned releasing-spring, which at the proper moment acts to release the frictional contact between the wedge-block and the frictional members. A bearing-pin passes freely through the wedge-block, said pin having a collar or shoulder adjacent to the smaller end thereof and being of such length that when the buffer-plate or draw-bar follower-plate is forced toward the carriers of the frictional members the compression of the releasing-spring is taken by the collar or shoulder of the bearing-pin in such manner that the releasing-spring cannot act to release the wedge-block until the buffer-plate has been moved some distance away from the ends of the carriers. When the buffer-plate recedes from the carriers, the collar of the bearing-pin is pressed against the smaller end of the wedge-block to release the same from frictional engagement with the carriers, thereby permitting the main draft and buffing springs to return all of the parts to their normal positions.

In the constructions set forth in Patents Nos. 545,994 and 556,197, before referred to, the wedge-block is surrounded by three carriers or segments, each carrying seven frictional strips or wedge-bars, six of which are detachably connected to the carrier by projections fitting appropriate recesses therein. In this instance eight carriers are shown as employed, each provided with a fixed central strengthening-rib and two detachable frictional strips or wedge-bars. In the prior constructions the projections of the frictional strips fitted the recesses of the carriers without any appreciable lost motion, so that all the frictional strips had to be practically released from a close contact with the corresponding members on the housing, such simultaneous release requiring in some instances almost the full effort of the mainspring. In my present invention the frictional strips, instead of being simultaneously released, as heretofore, are successively and independently released, preferably as shown, in groups of any preferred and determined number, although the same operative principle may be similarly carried out by effecting the separate and independent release of each individual member of the series. The independent release of different members is provided for by making the recesses of the carriers with which the projections of the frictional strips engage of suitably-determined different lengths, so that while one or more of said strips shall be compelled to move coincidently with its or their carrier or carriers progressively-increasing degrees of lost motion or independent traverse of the carriers relatively to other frictional strips or groups of strips shall be provided for. A suitable construction for the purpose is shown in the drawings, two sets of carriers or segments being employed. In the segments of one set one of the detachable frictional strips fits practically without any slackness or lost motion in the recess of the segment, while a small amount of lost motion—say one-sixteenth of an inch—is allowed in the recess of the other frictional strip of the same carrier. In the carriers of the other set an increased amount of lost motion—say one-eighth of an inch—is allowed in the recess of one of the frictional strips of each carrier, and a further increased amount of lost motion—say three-sixteenths of an inch—is allowed in the recess of the other frictional strip of the same carrier. The central or fixed strip in each case is reduced in size, so that it performs simply the function of a strengthening-rib for the segment. It will be seen that with this construction all of the frictional strips are simultaneously forced into frictional engagement with the corresponding members of the housing by the buffer-plate and that when a reverse action takes place by the opposite movement of the buffer-plate four of the frictional strips are first moved one-sixteenth of an inch before the segments encounter the resistance of the second group of four, the movement of one-sixteenth of an inch being sufficient to release the first four strips from their frictional contact with the sides of the corresponding grooves of the housing. The second, third, and fourth groups are in like manner independently and successively loosened and moved. In order that the two sets of carriers shall be properly relatively located, the segments of one set may be notched or recessed at each side of their outer ends and those of the other set provided with corresponding projections, thus insuring the ready and correct location and assemblage of the several carriers and frictional strips of the entire series.

In the accompanying drawings.

In the specific form of my invention which has been selected for illustration a draw-bar 1, provided with a suitable coupling-head $1^a$ and a housing or casing 2, within which are located the frictional mechanism and springs of the apparatus, are mounted and supported in a frame composed of two longitudinal plate members 3 3, guiding and supporting bars 7 7, and a distance-block $4^b$, which is interposed between the longitudinal members at their outer ends. The longitudinal members 3 3 are in the form of vertical plates of cast or wrought iron or steel and are continuous at and adjacent to their upper sides only, each being formed with an open-bottomed recess toward its inner end for the major portion of its depth to admit the housing 2 and buffer-plate 10. The longitudinal members are provided with upper flanges $3^b$ and lower flanges $3^c$ and are secured to the draft-timbers 5 or the center sills of the car and to an end sill 6 thereof by bolts 4, passing through their upper flanges. Their firm connection to the draft-timbers is further insured by the engagement of projections on their upper sides with corresponding recesses in the draft-timbers. The outer ends of the longitudinal members are connected by bolts $4^a$, passing through an interposed distance-block $4^b$, and are provided with upward projections $3^a$, which are recessed into the end sill 6 and together form a striking-plate. The housing 2 when in operative position rests and traverses on two supporting-bars 7, one of which is secured detachably to each of the longitudinal members, below the recess thereof, by bolts $7^a$. Vertical flanges $3^d$ on the longitudinal members, at the outer ends of the recesses thereof, serve as abutments for the follower-plate 10 when the apparatus is subjected to draft strains, and vertical flanges $3^e$ at the inner ends of the recesses form abutments for the inner end of the housing when the apparatus is subjected to buffing strains.

The housing 2 is substantially similar to that of Patents Nos. 545,994 and 556,197, aforesaid, being an integral casting which surrounds the springs and wedge-block of the apparatus, and upon the inside of which for the major portion of its length are formed the series of outer wedge-bars 16 of the frictional mechanism. Longitudinal flanges $2^a$, having shoulders at their inner ends, are formed upon the lower portion of the housing, and through said flanges and shoulders the housing rests upon and is guided in its traverse on the supporting-bars 7. Vertical displacement of the housing is prevented by the bearing of a plate $2^b$, on its inner end, against the tops of the recesses in the longitudinal members of the frame. The provision of the detachable supporting-bars 7 strengthens the frame, affords proper supports and guides for the housing, and enables the insertion and removal of the housing in and from operative position to be readily effected whenever desired.

The outer wedge-bars 16, which are carried by the housing, are, as in previous instances, of substantially triangular cross-section and are separated one from another by longitudinal grooves or recesses of similar cross-section, which receive the inner series of wedge-bars 13, to be presently described. The portion of the housing on which the outer wedge-bars are formed is tapered longitudinally at a comparatively slight angle from the open outer end of the housing which is nearer the draw-bar toward the opposite end, and the outer wedge-bars 16 are of uniform depth radially, so that their inner edges may be said to form elements of a frustum of a cone whose axis coincides with that of the housing. A conical bearing or abutment is thus provided, against which the inner wedge-bars are forced when subjected to pressure by the action of the wedge-block.

Tractive force applied to the draw-bar is transmitted to and acts upon the housing 2 to effect outward movement thereof by and through a U-shaped draft-strap 19, which extends around and abuts against the inner end of the housing and is secured at its forward end to the draw-bar by bolts $19^a$. Inward movement of the draw-bar, resultant upon buffing strains, imparts pressure to the housing through a buffer-plate or follower-plate 10, which fits freely against the inner end of the draw-bar and through interposed draft and buffing springs 9 and 11. Draft strains are transmitted from the housing to the car-frame through the bearing-faces of the flanges $3^d$ of the frame members 3 3, and under buffing strains the housing abuts against the bearing-faces of the flanges $3^c$ of said frame members.

A wedge-block 8, which is in the form of a frustum of a pyramid or cone, the former shape being adopted in this instance, is located within the housing 2, in line axially therewith, its larger end being toward the outer end of the housing, and a series of carrier plates or segments, composed of what may be termed an "initial" set 12 and a "secondary" set $12^a$, surrounds the wedge-block, each carrier-plate having a face on its inner side which fits on and is inclined correspondingly with one of the inclined faces of the wedge-block. A central longitudinal rib $13^a$, which serves as a strengthening-piece, is formed upon the outer side of each of the carrier-plates of both sets of the series, and transverse or circumferential grooves or recesses 15 $15^a$, which are of slightly-different widths, respectively, are formed in the carrier-plates 12 of the initial set on opposite sides of the central rib thereof. Similar grooves $15^b$ $15^c$ of slightly-different widths, respectively, and each of greater width than the wider of the grooves of the carrier-plates of the initial set, are formed in the carrier-plates of the secondary set. In order to insure the correct relative location in the series of the plates of the initial and secondary sets, lateral recesses 18 may be formed in the plates of the initial set and corresponding lateral projections $18^a$, adapted to fit therein, in the plates of the secondary set.

A series of inner wedge-bars 13, each of triangular section corresponding with that of the grooves or recesses between the outer wedge-bars 16 and having a tenon or projection 14 on its inner side, is placed on the outer sides of the series of carrier-plates 12 $12^a$, the tenons 14 of said wedge-bars each fitting in one of the circumferential recesses 15 $15^a$ $15^b$ $15^c$ of the carrier-plates. The tenons of the several wedge-bars are of uniform width, and, as before stated, the recesses of the carrier-plates are of relatively-increasing width, the narrowest recesses, which are formed in the carrier-plates of the initial set, being of such width that the tenons of the wedge-bars make practically a close fit therein, no lost motion or play being allowed. The opposite recesses of the carrier-plates of the initial set are made of slightly-greater width than the tenons—as, say, one-sixteenth of an inch—and that amount of independent movement of said plates relatively to the wedge-bars the tenons of which engage these recesses is thereby permitted. The recesses on one side of the carrier-plates of the secondary set are made so wide as to allow a greater amount of independent movement—as, say, one-eighth of an inch—and the opposite recesses of the plates of the secondary set are made still wider, so as to allow, say, three-sixteenths of an inch of independent movement. In the instance illustrated, there being eight carrier-plates in the entire series, each carrying two inner wedge-bars, or sixteen in all, the wedge-bars may, under the construction above described, be said to be divided into four groups relatively to the periods at which longitudinal movement will be imparted to them by such movement of the carrier-plates—that is to say, assuming, as is the case in practice, that longitudinal movement is imparted simultaneously to the entire series of carrier-plates, and that the wedge-bars are held stationary by a frictional resistance greater than that between their horizontal inner surfaces and the adjacent surfaces of the carrier-plates' movement, which will be both longitudinal and inward, will be first imparted to the first group of four wedge-bars, or those whose tenons fit without lost motion in the grooves, and the other twelve wedge-bars will not be acted on by the carrier-plates. As soon as the carrier-plates have moved one-sixteenth of an inch that amount of lost motion which is left in the opposite grooves of the carrier-plates of the initial set will be taken up and movement will be imparted to the second group of four wedge-bars, whose tenons rest in said grooves, so that in the continued traverse of the carrier-plates they will effect the movement of eight wedge-bars, the remaining eight not being acted on by them. Similarly, when they have moved one-eighth of an inch they will begin to act on and impart movement to the third group of four wedge-bars, whose tenons rest in the grooves on one side of the plates of the secondary set in which that amount of lost motion is left, thereby carrying with them twelve wedge-bars and leaving four unacted upon, and, finally, when the carrier-plates have moved three-sixteenths of an inch they will begin to act on and impart movement to the fourth group of four wedge-bars, whose tenons rest in the grooves on the opposite sides of the plates of the secondary set in which that amount of lost motion is left. During the residue of the traverse of the carrier-plates they will carry with them the entire series of inner wedge-bars.

Figure 16:
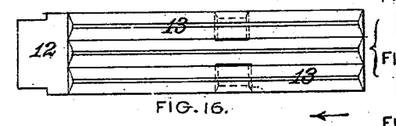
Figs. 16 to 23, inclusive, plan views of the carrier-plates in the sequence in which they are relatively disposed about the wedge-block with the wedge-bars in position, Figs. 16, 18, 20, and 22 representing the initial set of carrier-plates, and Figs. 17, 19, 21, and 23 the secondary set.
Figure 17:
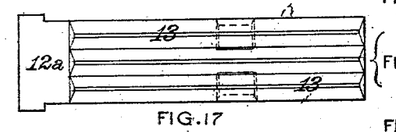
Figure 18:
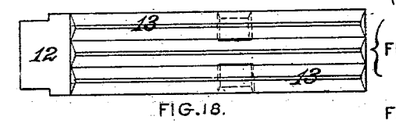
Figure 19:
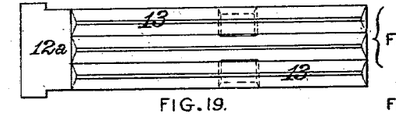
Figure 20:
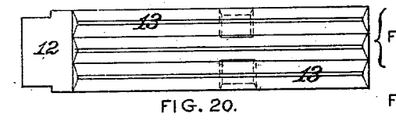
Figure 21:
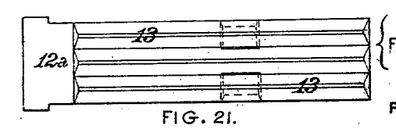
Figure 22:
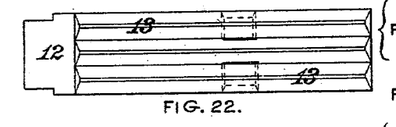
Figure 23:
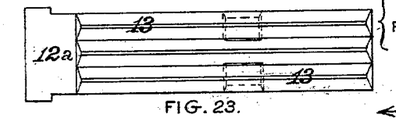
Figure 24:
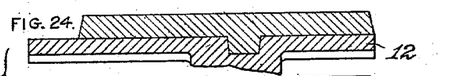
Figs. 24 to 39, inclusive, are longitudinal sections through the carrier-plates and wedge-bars shown in Figs. 16 to 23, each pair of figures, as connected by a brace, being sections through the upper and the lower wedge-bar, respectively, shown in the plan view opposite to which they are placed and all the figures showing the parts in the positions occupied at the commencement of the release of the first group of four wedge-bars.
Figure 25:
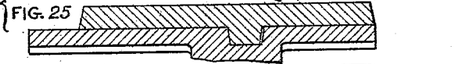
Figure 26:
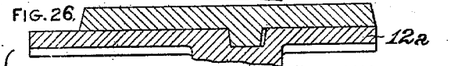
Figures 27, 28:
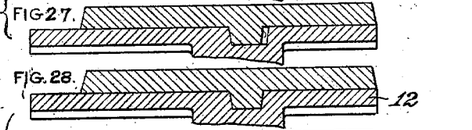
Figure 29:
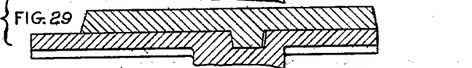
Figure 30:
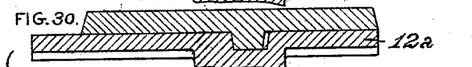
Figure 31:
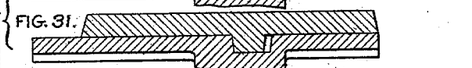
Figure 32:
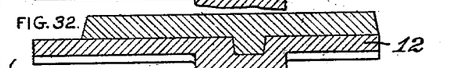
Figure 33:
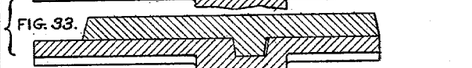
Figure 34:
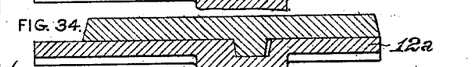
Figure 35:
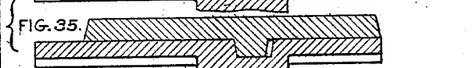
Figure 36:
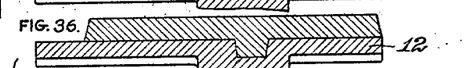
Figure 37:
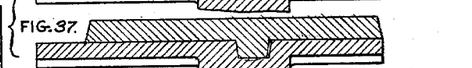
Figures 38, 39:
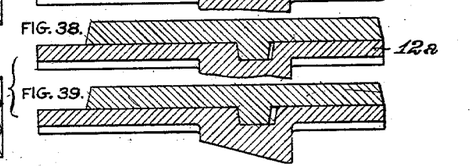
Figures 40, 41:
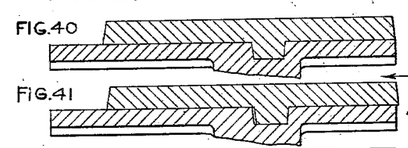
Figs. 40 to 55, inclusive, sections similar to Figs. 24 to 39, except that the parts are shown in the positions occupied at the commencement of the release of the second group of four wedge-bars.
Figures 42, 43, 44, 45:
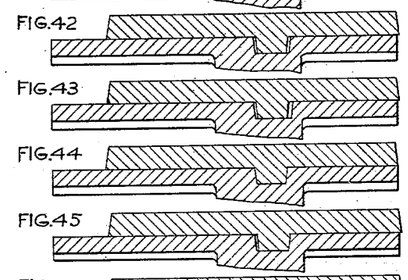
Figures 46, 47:
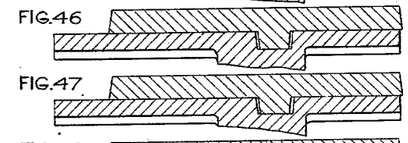
Figures 48, 49, 50:
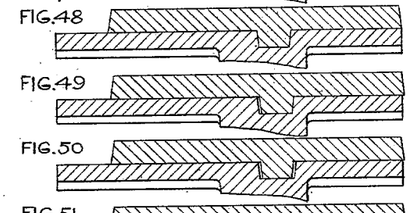
Figures 51, 52:
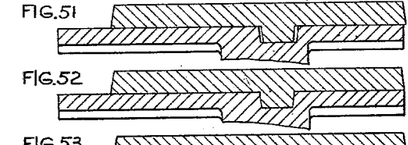
Figures 53, 54, 55:
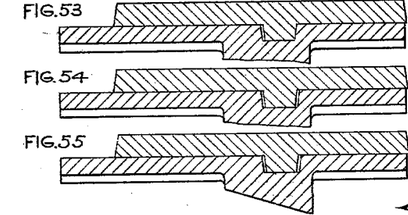
Figures 56, 57:
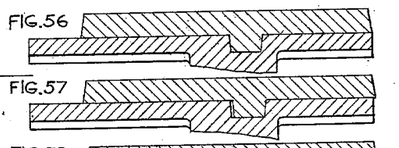
Figs. 56 to 71, inclusive, are sections similar to Figs. 24 to 39, except that the parts are shown in the positions occupied at the commencement of the release of the third group of four wedge-bars.
Figures 58, 59, 60, 61:
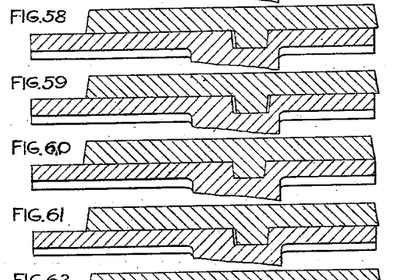
Figures 62, 63:
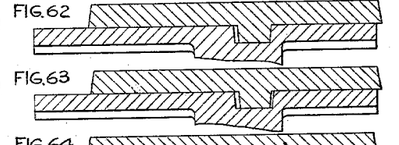
Figures 64, 65, 66:
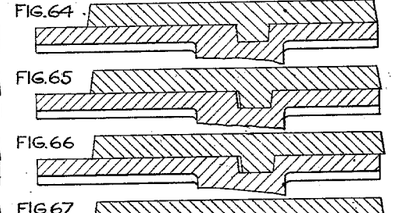
Figures 67, 68:
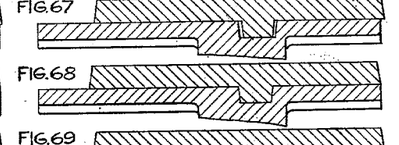
Figures 69, 70, 71:
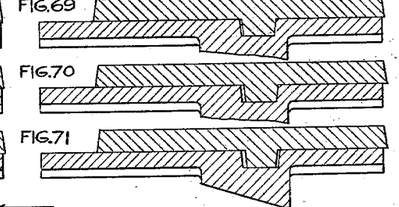
Figure 72:
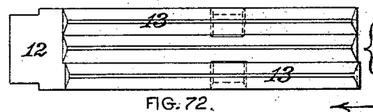
Figs. 72 to 79, inclusive, plan views of the carrier-plates in operative sequence with the inner wedge-bars in the positions occupied at the commencement of the release of the fourth group of four wedge-bars.
Figure 73:
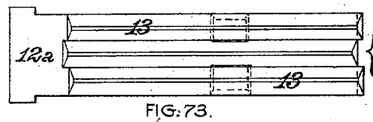
Figure 74:
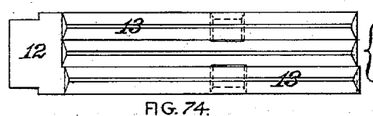
Figure 75:
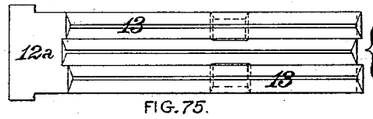
Figure 76:
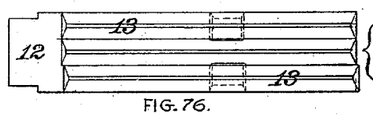
Figure 77:
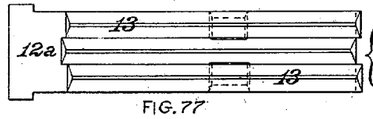
Figure 78:
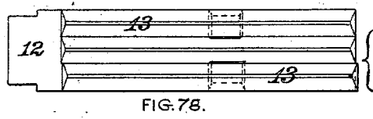
Figure 79:
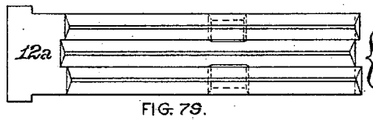
Figures 80, 81:
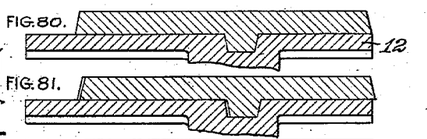
Figs. 80 to 95, inclusive, sections similar to Figs. 24 to 39, except that the parts are shown in the positions occupied at the commencement of the release of the fourth group of four wedge-bars.
Figures 82, 83, 84:
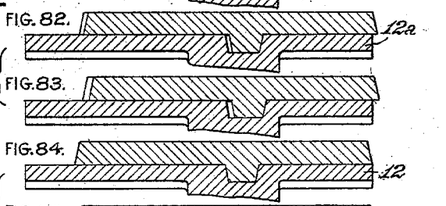
Figures 85, 86, 87:
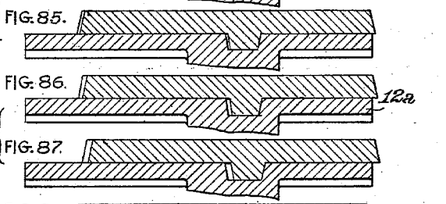
Figures 88, 89, 90:
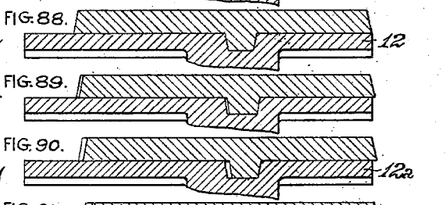
Figures 91, 92:
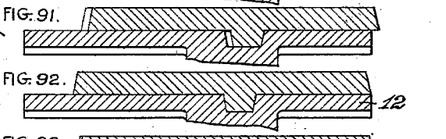
Figures 93, 94, 95:
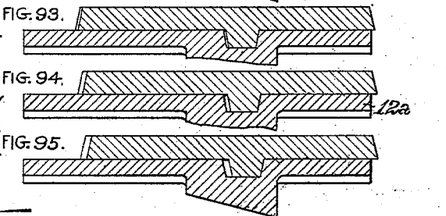

The serial or successive action of the carrier-plates upon the several groups of inner wedge-bars, as above described, is clearly illustrated in Figs. 16 to 95, inclusive, by reference to which, and having in mind that the movement of the carrier-plates is in each case in the direction of the arrows, it will be seen that at the commencement of the traverse of said plates the shoulders of their recesses bear and act only on the tenons of four of the wedge-bars—to wit, those resting in the narrower recesses of the initial set, as shown in Figs. 24, 28, 32, and 36. When the carrier-plates have traversed a distance equal to the amount of lost motion left in the wider recesses of the initial set, the shoulders of said recesses will bear and act on the tenons of the second group of four wedge-bars which rest therein, as shown in Figs. 41, 45, 49, and 53, and in the continued traverse of the carrier-plates they will act on eight wedge-bars, as shown in Figs. 40, 41, 44, 45, 48, 49, 52, and 53. When the carrier-plates have traversed a distance equal to the amount of lost motion left in the narrower recesses of the secondary set, the shoulders of said recesses will bear and act on the tenons of the third group of wedge-bars which rest therein, as shown in Figs. 58, 62, 66, and 70, and in the continued traverse of the carrier-plates they will act on twelve wedge-bars, as shown in Figs. 56, 57, 58, 60, 61, 62, 64, 65, 66, 68, 69, and 70. When the carrier-plates have traversed a distance equal to the amount of lost motion left in the wider recesses of the secondary set, the shoulders of said recesses will bear and act on the tenons of the fourth group of wedge-bars which rest therein, as shown in Figs. 83, 87, 91, and 95, and in the continued traverse of the carrier-plates they will act upon the entire series of inner wedge-bars, as shown in Figs. 80 to 95, inclusive.

It will be obvious to the skilled constructor that the number of carrier-plates, the number of inner wedge-bars carried on each plate, and the extent of independent movement or lost motion of the carrier-plates relatively to the wedge-bars may be varied to any desired degree without departure from the spirit of my invention, so that the several inner wedge-bars of the series may be serially or successively acted upon by the carrier-plates either individually or in groups of greater or less number and at such intervals as may be desired and determined.

Figure 1:
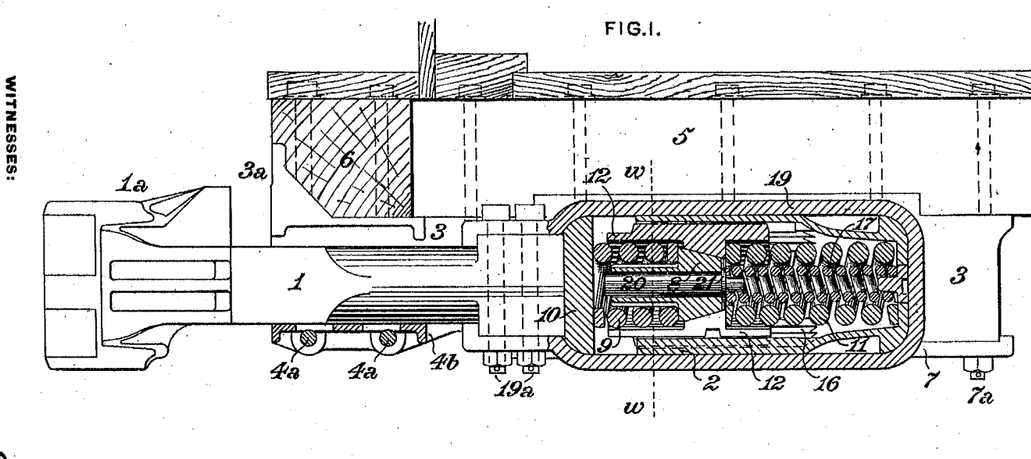
Figure 1 is a view, partly in elevation and partly in vertical longitudinal central section, of a draft and buffing apparatus, illustrating an embodiment of my invention.
Figure 2:
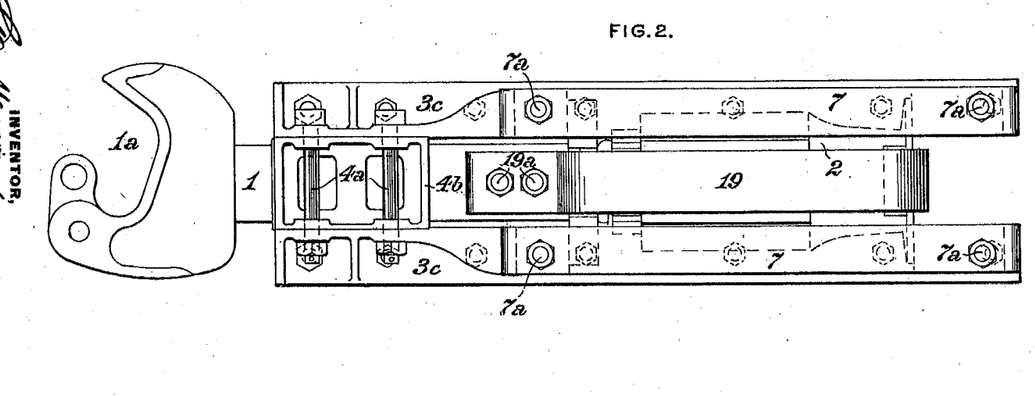
Fig. 2, an inverted plan view of the same.
Figure 3:
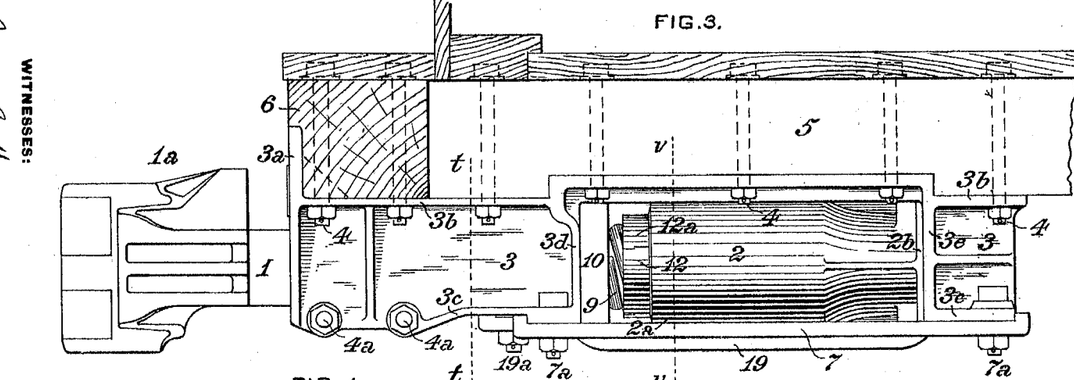
Fig. 3, a side view in elevation.
Figure 4:
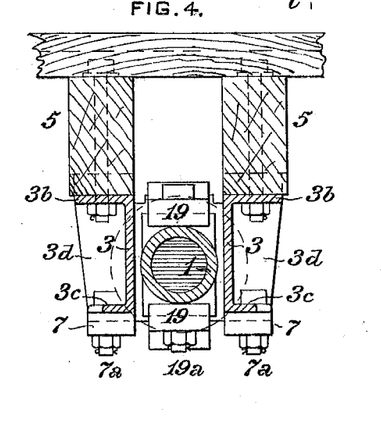
Fig. 4, a transverse section at the line $t\,t$ of Fig. 3.
Figure 5:
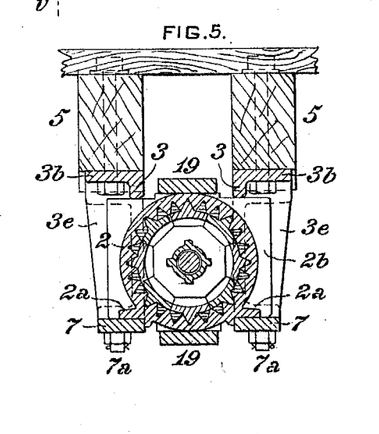
Fig. 5, a similar section at the line $v\,v$ of Fig. 3 with the outer spring omitted.
Figure 6:
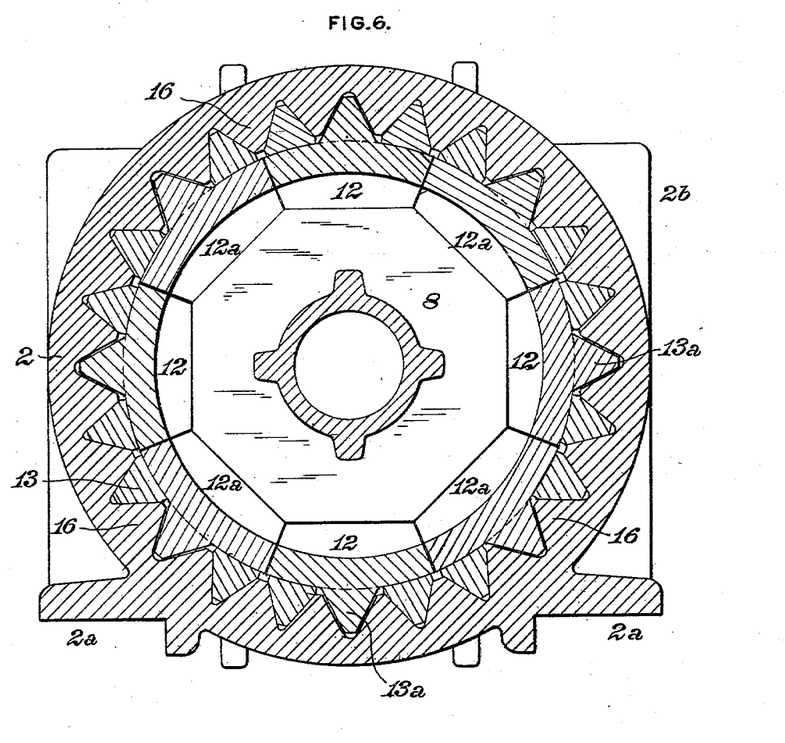
Fig. 6, a transverse section, on an enlarged scale, through the housing, with the outer spring omitted, at the line $w\,w$ of Fig. 1.
Figure 7:
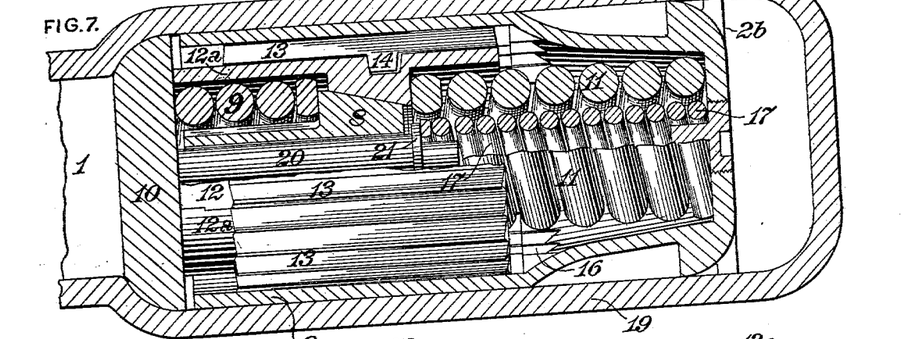
Fig. 7, a partial vertical longitudinal central section, on an enlarged scale, showing the parts in the positions occupied when the apparatus is subject to maximum compressive buffing strain.
Figure 8:
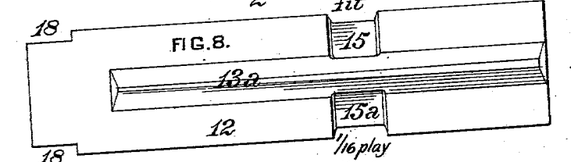
Fig. 8, a plan view of one of the initial set of carrier-plates.
Figures 9, 10, 12, 13, 14, 15:
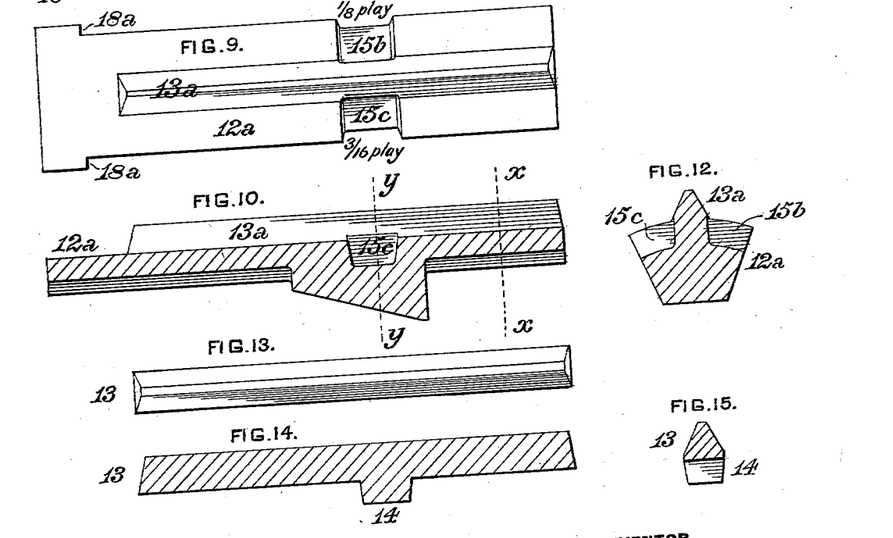
Fig. 9, a similar view of one of the secondary set of carrier-plates.
Fig. 10, a longitudinal section through the carrier-plate shown in Fig. 9.
Figs. 11 and 12, transverse sections through the same at the lines $x\,x$ and $y\,y$, respectively, of Fig. 10.
Fig. 13, a plan view of one of the inner wedge-bars.
Fig. 14, a longitudinal section through the same.
Fig. 15, a transverse section through the same.
Figure 11:
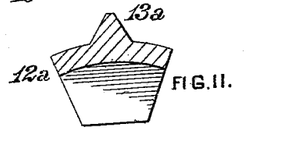

An outer main draft and buffing spring 9 surrounds a tubular stem formed on the wedge-block 8, the ends of said spring resting without substantial tension thereon when the parts are in normal position in readiness for operation on the inner side of the follower-plate 10 and the outer side of the wedge-block 8, respectively. An inner draft and buffing spring 11 of greater tension than that of the outer spring 9 abuts at its inner end on the inner end of the housing 2 and at its outer end on the inward projections of the carrier-plates 12 12$^a$, which fit the inclined surfaces of the wedge-block, said spring constantly tending to maintain the carrier-plates in frictional contact with the wedge-block. A releasing-spring 17, located in the housing inside of the inner draft and buffing spring 11, abuts at its inner end on the inner end of the housing and at its outer end on a collar 21, formed on a bearing-pin 20, which passes freely through the wedge-block. The bearing-pin 20 is made of such length that when the buffer-plate 10 is out of contact with the outer ends of the carrier-plates the collar 21 is pressed by the releasing-spring 17 against the smaller end of the wedge-block, as shown in Fig. 1, and the wedge-block is thereby released from frictional engagement with the carrier-plates. When, however, the buffer-plate is forced inward by a sufficient buffing strain, it bears on the outer end of the pin 20 and moves the collar 21 thereof away from the smaller end of the wedge-block, as shown in Fig. 6, thereby relieving the wedge-block from the pressure of the releasing-spring 17 and causing the same to be taken by the collar 21. When the collar of the bearing-pin is thus moved out of contact with the wedge-block, it will be seen that the latter is released from any action which would tend to reduce or impair the degree of its frictional engagement with the carrier-plates.

The provision of means whereby releasing action is exerted upon the wedging device when and only when it is necessary or desirable that frictional resistance should be released and the wedging device is rendered exempt from releasing action during the periods in which frictional resistance due to its wedging action is required to be exerted is a leading and essential characteristic of my present invention, and such feature being, so far as my knowledge and information extend, broadly new I do not desire to limit myself to the specific mechanism for its utilization in practice which is herein exemplified.

In the operation of the apparatus, the parts being in the positions shown in Fig. 1, when the draw-bar is forced inwardly by a sufficient buffing strain the buffer-plate 10 is forced to the right, compressing the outer mainspring 9 and imparting pressure through said spring to the wedge-block 8, which, acting on the inclined portions of the carrier-plates 12 12$^a$, forces said carrier-plates and the series of inner wedge-bars 13, carried thereon, radially outward. The inner wedge-bars are thereby tightly wedged in the spaces between the outer wedge-bars 16 of the housing, and when no further outward movement of the inner wedge-bars can be effected the carrier-plates and inner wedge-bars and the wedge-block will be moved together to the right. The bearing-pin 20 has meanwhile been moved to the right by the pressure of the buffer-plate on its outer end, and the wedge-block having been thereby freed from the pressure of the releasing-spring 17 no obstacle is presented to the full exercise of its wedging action on the carrier-plates. The longitudinal movement of the carrier-plates to the right compresses the inner mainspring 11, and the longitudinal taper of the housing causes a further wedging of the outer and inner wedge-bars as the latter are moved to the right. The friction between the contact-surfaces of the inner and outer wedge-bars, together with the resistance of the springs 9, 11, and 17 to the compression to which they are subjected, takes up without shock the buffing strain imparted to the draw-bar and stops the inward movement thereof, the inward pressure being transferred to the car-sills through the bearing-faces of the vertical flanges 3$^e$ of the apparatus, against which the housing abuts at its inner end. Upon the relief of inward pressure upon the draw-bar the parts are returned to the normal positions shown in Fig. 1 by the action of the several springs. The expansion of the spring 9 moves the buffer-plate and draw-bar outwardly until the buffer-plate abuts against stops or shoulders on the main frame-bars 3 3. After the maximum buffing strain has been reduced and the application of force has been reversed—that is to say, a preponderance of outward force in the then higher tension of the releasing-spring 17 has been exerted—the releasing-spring 17 forces the collar 21 of the bearing-pin 20 against the smaller end of the wedge-block and, acting against the reduced resistance of the expanding main outer spring 9, releases the wedge-block from its frictional engagement with the carrier-plates. The resistance of the wedge-block to the loosening and inward movement of the inner wedge-bars having been thus relieved, said bars are, in groups of four each, serially or successively loosened and moved out of frictional engagement with the outer wedge-bars 16, in the manner hereinbefore described, by the outward pressure of the expanding mainspring 11 upon the inner ends of the inward projections of the series of carrier-plates.

In the application of a draft strain to the draw-bar outward movement is imparted to housing 2 by the draft-strap 19, which is connected to the draw-bar, and the mainspring 9 is initially compressed. The resistance of the spring 9 to compression tends to prevent outward movement of the wedge-block 8, and the pressure on the spring 11 moves the carrier-plates and inner wedge-bars longitudinally outwardly, the carrier-plates in such longitudinal traverse moving upwardly upon the inclined surfaces of the wedge-block, and thereby moving the inner wedge-bars 13 radially outwardly and wedging them in the recesses between the outer wedge-bars 16, and the continued traverse of the housing under the strain of draft will effect compression of the mainspring 11 and releasing-spring 17. After the mainspring 9 has been fully compressed the housing, with the carrier-plates and the inner wedge-bars, will be moved longitudinally outwardly until the outer ends of the carrier-plates and the outer end of the bearing-pin 20 abut against the buffer-plate. The pressure of the buffer-plate on the bearing-pin moves its collar 21 away from the smaller end of the wedge-block, and thereby prevents releasing action of the spring 17 on the wedge-block. The longitudinal outward movement of the carrier-plates is resisted by the friction between the inner and outer wedge-bars and the wedging action due to the longitudinal taper of the housing. The spring 11 will be further compressed after the carrier-plates have been moved up against the buffer-plate by the further movement of the housing until its resistance to compression and the resistance of the frictional members overcome the draft strain. Upon the release of draft strain the parts will be returned to their normal positions (shown in Fig. 1) by the springs.

My invention attains in practice a substantial and material advantage by reason of insuring the prompt and certain release of the frictional members upon the cessation of strain thereon without involving the impairment of their effectiveness in and for resistance to strains during the periods in which they are subjected thereto, and for furnishing which resistance they are designed and provided. The serial or step-by-step action of the mainspring in effecting the release of the inner wedge-bars from the outer ones enables the expansive force of the spring to be more effectually exerted and the releasing operation to be correspondingly facilitated and made certain, inasmuch as the resistance of the locked series of wedge-bars being divided into fractions, which are independently and successively encountered and overcome by the expansion of the spring, the action thereof is to a material degree more easy, effective, and reliable than when, as in the prior constructions, exerted against the aggregate resistance of the entire series of wedge-bars.

I claim as my invention and desire to secure by Letters Patent—

1. In a draw-gear or buffing apparatus, the combination, substantially as set forth, of intercalated frictional devices, a wedging device for imposing frictional resistance thereon, and means for releasing said wedging device which are adapted to be inert during the exertion of maximum compressive strain, and operative as to releasing action, when, and only when, said maximum strain has been reduced.

2. In a draw-gear or buffing apparatus, the combination, substantially as set forth, of intercalated frictional devices, a wedging device for imposing frictional resistance thereon, means for releasing said wedging device, and means for preventing the action of the releasing means upon the wedging device during the exertion of maximum compressive strain.

3. In a draw-gear or buffing apparatus, the combination, substantially as set forth, of intercalated frictional devices, a wedging device for imposing frictional resistance thereon, means for releasing said wedging device, and means for preventing the action of the releasing means upon the wedging device during the exertion of maximum compressive strain, and instituting releasing action after the reduction of said maximum strain.

4. In a draw-gear or buffing apparatus, the combination, substantially as set forth, of a series of frictional devices, a series of relatively movable frictional devices adapted to engage therewith, a wedging device for forcing the two series of frictional devices into frictional engagement, means for applying compressive strain to the frictional devices and wedging device, means for releasing the wedging device from the frictional devices, and means for preventing the action of the releasing means upon the wedging device during the exertion of maximum compressive strain and instituting releasing action after the reduction of said maximum strain.

5. In a draw-gear or buffing apparatus, the combination, substantially as set forth, of intercalated frictional devices, a wedging device for imposing frictional resistance thereon, a spring which is adapted, under compressive strain, to produce frictional engagement of the frictional devices and the wedging device, and means for releasing said wedging device which are adapted to be inert during the exertion of maximum compressive strain upon the spring, and operative, as to releasing action, when, and only when, said maximum strain has been reduced.

6. In a draw-gear or buffing apparatus, the combination, substantially as set forth, of a series of frictional devices, a series of relatively movable frictional devices adapted to engage therewith, a wedging device for forcing the two series of frictional devices into frictional engagement, means for applying compressive strain to the frictional devices and wedging device, means for releasing the wedging device from the frictional devices, means for preventing the action of the releasing means upon the wedging device during the exertion of maximum compressive strain and instituting releasing action after the reduction of said maximum strain, and means for releasing the two series of frictional devices one from the other after the release of the wedging device.

7. In a draw-gear or buffing apparatus, the combination, substantially as set forth, of a housing carrying a series of outer wedge-bars, a wedge-block, a series of carrier-plates surrounding said wedge-block and fitting inclines thereon, a series of inner wedge-bars resting on the carrier-plates and adapted to bear against the series of outer wedge-bars, a draw-bar, a buffer-plate through which pressure is transmitted from and to the draw-bar, a mainspring abutting on the buffer-plate and on the larger end of the wedge-block, a mainspring abutting on the housing, and on the carrier-plates at the smaller end of the wedge-block, a bearing-pin passing freely through the wedge-block, a collar fixed on the bearing-pin in position to bear on the smaller end of the wedge-block, at such distance from the opposite end of the pin as to be moved clear of the wedge-block by the buffer-plate when effecting compression of the main-springs, and a releasing-spring abutting on said collar and on the inner end of the housing.

8. In a draw-gear or buffing apparatus, the combination, substantially as set forth, of intercalated frictional devices, a wedging device for imposing frictional resistance thereon, and means for independently and successively exerting releasing action upon different units or groups of the frictional devices.

9. In a draw-gear or buffing apparatus, the combination, substantially as set forth, of intercalated frictional devices, a wedging device for imposing frictional resistance thereon, and means for independently and successively imparting movement to units or groups of the frictional devices, relatively to counterparts with which they are frictionally engaged, in direction to release such frictional engagement.

10. In a draw-gear or buffing apparatus, the combination, substantially as set forth, of a series of frictional devices, a series of relatively movable frictional devices adapted to engage therewith, a wedging device for forcing the two series of frictional devices into frictional engagement, and means for independently and successively imparting movement to units or groups of one series of frictional devices, in direction to effect their serial or successive release from the other series.

11. In a draw-gear or buffing apparatus, the combination, substantially as set forth, of a series of frictional devices, a series of relatively movable frictional devices adapted to engage therewith, a wedging device for forcing the two series of frictional devices into frictional engagement, carriers interposed between the wedging device and one of the series of frictional devices, connections between said carriers and the adjacent series of frictional devices which permit independent movement of the carriers relatively to different units or groups of the connected frictional devices, and means for imparting movement to the carriers, in direction to release the frictional engagement of the two series of frictional devices.

12. In a draw-gear or buffing apparatus, the combination, substantially as set forth, of a housing carrying a series of outer wedge-bars, a wedge-block, a series of carrier-plates surrounding the wedge-block and fitting inclines thereon, a series of inner wedge-bars resting on the carrier-plates and adapted to bear against the series of outer wedge-bars, tenons on the inner wedge-bars adapted to engage with the carrier-plates, recesses in the carrier-plates adapted to receive the tenons of the inner wedge-bars, and of different widths, respectively, relatively to the tenons of different units or groups of the inner wedge-bars, and a spring abutting on one end of the housing and on the adjacent ends of the carrier-plates.

13. In a draw-gear or buffing apparatus, the combination, substantially as set forth, of a housing carrying a series of outer wedge-bars, a wedge-block, two or more sets of carrier-plates surrounding the wedge-block and fitting inclines thereon, interlocking members for regulating the disposal of the sets of carrier-plates in determined serial relation, a series of inner wedge-bars resting on the carrier-plates and adapted to bear against the outer wedge-bars, tenons on the inner wedge-bars adapted to engage with the carrier-plates, recesses in the carrier-plates adapted to receive the tenons of the inner wedge-bars, and of different widths, respectively, in the different sets of carrier-plates, relatively to the tenons of different units or groups of the inner wedge-bars, and a spring abutting on one end of the housing and on the adjacent ends of the carrier-plates.

GEO. WESTINGHOUSE.

Witnesses:
J. SNOWDEN BELL,
H. A. CROOKS.